United States Patent
Bolik et al.

(10) Patent No.: US 9,626,105 B2
(45) Date of Patent: *Apr. 18, 2017

(54) CONTROLLING A STORAGE SYSTEM

(71) Applicant: International Business Machines Corporation, Armonk, NY (US)

(72) Inventors: Christian Bolik, Bremen (DE); Uwe Fiebrich-Kandler, Mainz (DE); Dietmar Noll, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 1035 days.

This patent is subject to a terminal disclaimer.

(21) Appl. No.: 13/647,451

(22) Filed: Oct. 9, 2012

(65) Prior Publication Data
US 2013/0151774 A1 Jun. 13, 2013

(30) Foreign Application Priority Data
Dec. 12, 2011 (EP) .................... 11192925

(51) Int. Cl.
G06F 3/06 (2006.01)
G06F 11/34 (2006.01)

(52) U.S. Cl.
CPC .......... G06F 3/0604 (2013.01); G06F 3/0653 (2013.01); G06F 3/0683 (2013.01); G06F 11/3433 (2013.01); G06F 11/3485 (2013.01); G06F 2201/81 (2013.01)

(58) Field of Classification Search
CPC .................................................. G06F 3/0631
See application file for complete search history.

(56) References Cited

U.S. PATENT DOCUMENTS

| 5,875,456 | A  | 2/1999  | Stallmo et al.  |
| 6,823,382 | B2 | 11/2004 | Stone           |
| 7,249,240 | B2 | 7/2007  | Nakagawa et al. |
| 7,454,583 | B2 | 11/2008 | Yagisawa et al. |
| 7,809,917 | B2 | 10/2010 | Burton et al.   |

(Continued)

FOREIGN PATENT DOCUMENTS

EP 2302500 3/2011

OTHER PUBLICATIONS

Bolik et al., "Controlling a Storage System," U.S. Appl. No. 13/787,037, filed Mar. 6, 2013, 33 pages.

(Continued)

Primary Examiner — Gary W Cygiel
(74) Attorney, Agent, or Firm — Yee & Associates, P.C.; Richard A. Wilhelm

(57) ABSTRACT

A method, computer-readable storage medium and computer system for controlling a storage system, the storage system comprising a plurality of logical storage volumes, the method comprising: monitoring, for each of the logical storage volumes, one or more load parameters; receiving, for each of the logical storage volumes, one or more load parameter threshold values; comparing, for each of the logical storage volumes, the first load parameter values of said logical storage volume with the corresponding one or more load parameter threshold values; in case at least one of the first load parameter values of one of the logical storage volumes violates the load parameter threshold value it is compared with, automatically executing a corrective action.

5 Claims, 4 Drawing Sheets

(56) References Cited

U.S. PATENT DOCUMENTS

| | | | |
|---|---|---|---|
| 7,886,034 B1 | 2/2011 | Hartmann et al. | |
| 7,949,847 B2 | 5/2011 | Murase | |
| 8,051,243 B2 | 11/2011 | Murase | |
| 8,224,782 B2 | 7/2012 | Murase | |
| 2007/0174536 A1* | 7/2007 | Nakagawa | G06F 3/0605 |
| | | | 711/2 |
| 2009/0182777 A1 | 7/2009 | Bolik et al. | |
| 2009/0276588 A1 | 11/2009 | Murase | |
| 2010/0082765 A1 | 4/2010 | Murase | |
| 2013/0185506 A1 | 7/2013 | Bolik et al. | |

OTHER PUBLICATIONS

Sivasubramanian et al., "SLA-Driven Resource Provisioning of Multi-Tier Internet Applications", Technical Report, Department of Mathematics and Computer Science, Copyright 2006, 14 pages.

Office Action, dated Apr. 22, 2016, regarding U.S. Appl. No. 13/787,037, 21 pages.

Final Office Action, dated Sep. 14, 2016, regarding U.S. Appl. No. 13/787,037, 12 pages.

Notice of Allowance, dated Nov. 18, 2016, regarding U.S. Appl. No. 13/787,037, 5 pages.

\* cited by examiner

CONTROLLING A STORAGE SYSTEM

FIELD OF THE INVENTION

The invention relates to the field of data storage management, and more particularly to the controlling of a storage system.

BACKGROUND

The demand for the automated management of an IT infrastructure, in particular the management and provision of storage space, has been constantly growing. The provision of storage space to a plurality of clients is typically based on a contract comprising a so called "service level agreement" (SLA) specifying the level of service a storage provider has agreed to provide to the respective client. Service level agreements can contain numerous service performance metrics which may be expressed in the form of service-level objectives. There is a need in the art for ensuring, in a cost-efficient manner, that storage volumes provided to the client devices are performing in accordance with the respective SLAs.

Prior art approaches for avoiding performance-related SLA violations are typically based on moving all the data of a storage volume, being part of a storage pool which is too heavily used for ensuring compliance with the SLAB, to a different storage volume of the storage environment. A drawback of this approach is that the complete amount of data of the source storage volume has to be transferred to the destination storage volume, thereby producing significant workload on the respective source and destination storage pools and in the storage network connecting the two. In addition, oftentimes storage devices constituting the logical storage volumes of a storage pool are structured in such a way that migrating data from one logical storage volume to another is not possible in every case due to technical constraints relating to incompatible properties of the physical storage volumes. In addition, organizational constraints for the migration of data exist as storage volumes and storage pools are commonly assigned specifically to groups or departments.

SUMMARY OF THE INVENTION

It is an objective of embodiments of the invention to provide for an improved computer implemented method, storage medium and computer system for controlling a storage system. The objective is solved by the features of the independent claims. Preferred embodiments are given in the dependent claims.

A 'storage system' as used herein encompasses any kind of monolithic or distributed computer system comprising one or more storage volumes and comprising program logic for automatically or semi-automatically controlling the storing of data in one or more of said storage volumes.

A 'storage volume' as used herein encompasses any single accessible storage area within a single file system. A logical storage volume is a storage volume whose storage blocks (or 'blocks') are mapped to one or more physical storage volumes.

A 'physical storage volume' as used herein is any kind of storage media comprising an own read/write head or other facility to read data from and/or write data to said physical storage volume. Thus, depending on the mapping, performing a read/write operation on a logical storage volume may comprise one or more physically executed read/write operations on the respectively mapped one or more physical storage volumes. Typically, physical storage volumes are grouped into one or more storage pools and the storage space provided by said pools may be allocated to logical storage volumes.

A 'service level objective' (SLO) as used herein is a set of one or more parameter-value pairs, e.g. values for the mean time between failures, mean time to repair, various data transfer rates, or similar measurable details being characteristic for a particular service level and being provided to any client having subscribed to said service level.

A 'storage device' as used herein is any device being operable to permanently or temporarily store computer-interpretable data and/or instructions. In particular, and without limitation, a storage device can be anyone of a Fiber Channel disk, a Mirrored disk, a RAID protected disk, a SATA drive, a network attached storage, a short tape, a WORM tape, an Encryption Tape, a Long tape, a Flash drive, solid state discs (SSD), Serial ATA discs (SATA) and various optical storage devices.

The term 'striping' or 'striping technique' as used herein refers to a technique of segmenting logically sequential data, such as a logical storage volume, and spreading said segments over two or more physical storage volumes, thereby allowing concurrent access to the respective segments.

The term 'load parameters' as used herein encompasses any kind of parameters being indicative of the extent of usage of a storage volume. Such characteristics may comprise, for example, the occupied and/or free storage space on said storage volume, the number of input and/or output operations (I/O operations) per time, the amount of data written to and/or read from the storage volume, a response time in respect to an I/O request or access times and the like.

In one aspect, the invention relates to a computer-implemented method for controlling a storage system. The storage system comprises a plurality of logical storage volumes and provides storage space of one or more of said logical storage volumes to one or more clients. The method comprises: monitoring, for each of the logical storage volumes, one or more load parameters being indicative of a current I/O load of said logical storage volume for obtaining first load parameter values; receiving, for each of the logical storage volumes, one or more load parameter threshold values; and comparing, for each of the logical storage volumes, the first load parameter values with the corresponding one or more load parameter threshold values received for said logical storage volume. In case at least one of the first load parameter values of one of the logical storage volumes violates the load parameter threshold value it is compared with, the method further comprises executing a corrective action, the corrective action being selected from the group consisting of:

modifying a ratio of high-performing physical storage volumes and low-performing physical storage volumes constituting said one logical storage volume;

disabling or enabling a data compression functionality of said logical storage volume, the data compression functionality automatically compressing any data stored to said one logical storage volume;

modifying a physical-to-logical mapping of storage blocks of one or more physical storage volumes constituting said logical storage volumes, thereby increasing the number of physical storage volumes constituting said logical storage volume by adding additional physical storage volumes to the mapping or decreasing the number of physical storage volumes constituting said logical storage volume by removing one or more of said mapped physical storage volumes from said mapping; and, in case said number is increased, spreading one or more sub-parts of all data stored on said logical storage volume to the one or more added physical storage volumes or, in case said number is decreased, moving data stored on the one or more physical storage volumes removed from the mapping to one or more remaining physical storage volumes constituting said one logical storage volume after the modification of the mapping;

modifying a size of a cache memory associated with said one logical storage volume; and modifying a grouping, said grouping assigning each of a plurality of controller nodes a disjunct group of the physical storage volumes to be controlled by said controller node, the modification increasing or decreasing the number of physical storage volumes controlled by one of said controller nodes, said one controller node currently controlling at least one of the physical storage volumes mapped to memory blocks of said one logical storage volume.

A 'load parameter value violating a load parameter threshold value' as used herein is a load parameter value lying below or exceeding said threshold value. Depending on the type of the load parameter threshold value, a measured parameter value lying below said threshold may be indicative of a higher load than specified in said threshold or a lower load than specified in this threshold. This is because many different parameters and corresponding thresholds are indicative of the I/O load of a particular logical and/or physical storage volume. Said features may be advantageous in that they allow dynamically determining and executing appropriate actions for preventing impending breaches of service level objectives (SLOB) and/or for correcting already occurred SLO breaches without triggering the migration of all data of a storage volume to another volume. Thus, a full volume migration and the corresponding data traffic within the storage system can in many cases be avoided completely. In a further advantageous aspect, existing storage volumes can be used more effectively and purchasing of additional storage volumes in order to guarantee a particular level of service may be avoided. In a further advantageous aspect, the life expectancy of the physical storage volumes constituting the logical storage volumes of the storage system may be prolonged as the total amount of data migrated from and to the storage volumes, and therefore the frequency of read and/or write operations per volume, is reduced. In a further advantageous aspect, embodiments of the invention are operable to fully automatically determine the one or more appropriate actions for increasing the performance of a volume or for decreasing the performance in order to free physical storage volumes for use by other logical volumes. This is not possible in many state of the art storage systems relying on a static configuration of the behavior of the storage system. By avoiding a full volume migration, i.e., a migration of the whole data content of a logical storage volume to another one, the storage network remains available for I/O requests of applications and is not clogged by the data traffic caused by the full volume migration.

A 'low-performing storage volume' as used herein is a storage volume having a higher performance relative to any one of the low-performing storage volumes in respect to at least one parameter being indicative of the performance of a storage volume. Such parameters can be, for example, I/O times, latency, and the like.

According to embodiments, the received load parameter threshold values comprise maximum load parameter threshold values being indicative of a maximum allowable load of said one logical storage volume. In case the at least one first load parameter value of said logical storage volume is indicative of a higher load of said one logical storage volume than allowable according to the maximum load parameter threshold value it is compared with, automatically executing the corrective action being selected from a group consisting of:

executing the modification of the ratio by increasing the ratio of high-performing physical storage volumes and low-performing physical storage volumes constituting said logical storage volumes;

executing the disabling of the data compression functionality of said logical storage volume;

modifying the physical-to-logical mapping by increasing the number of physical storage volumes constituting said logical storage volume;

executing the cache size modification by increasing the size of a cache memory associated with said logical storage volume; and executing the modification of the grouping by decreasing the number of physical storage volumes controlled by said one controller node.

Thus, in case it was determined that the current load of a logical storage volume is so high that compliance with one or more load parameter threshold values as expressed, for example, in the form of SLOs, can no longer be guaranteed, one out of the plurality of different actions is automatically performed in order to make sure that data stored in said logical storage volume is provided in accordance with said load parameter threshold values.

Said actions may increase the performance of a particular logical storage volume by automatically increasing the ratio of high-performing physical storage volumes constituting said logical storage volumes. An automated storage system such as IBM's EasyTier system is operable to dynamically and transparently (without notifying a user) move data blocks or extents from a physical storage volume constituting a first logical storage volume to another physical storage volume of the same logical storage volumes. By disabling a data compression functionality of a particular logical storage volume or of all logical storage volumes of a particular storage pool, the speed of I/O operations executed on that logic volume can be increased as any compression and decompression step is disabled. Alternatively, or in addition, the physical-to-logical mapping of said logical storage volume may be modified to increase the total number of physical storage volumes constituting said logical storage volume. Said feature may be advantageous as the same amount of data is distributed to a large number of physical storage volumes and corresponding reads/writes heads which can operate concurrently. By automatically increasing the size of a cache memory associated with said logical storage medium, swapping can be avoided for increasing the speed of reading and/or writing data to said logical storage volume.

According to embodiments, the received load parameter threshold values comprise minimum load parameter threshold values being indicative of a minimum allowable load of said one logical storage volume. In case the at least one first load parameter value of one of the logical storage volumes is indicative of a lower load of said one logical storage volume than allowable according to the minimum load parameter threshold value it is compared with, automatically executing the corrective action being selected from a group consisting of: executing the modification of the ratio by decreasing the ratio of high-performing physical storage volumes and low-performing physical storage volumes constituting said logical storage volumes; executing the enabling of the data compression functionality of said logical storage volume; and modifying the physical-to-logical mapping by decreasing the number of physical storage volumes constituting said logical storage volume; executing the cache size modification by decreasing the size of the cache memory associated with said logical storage volume; and executing the modification of the grouping by decreasing the number of physical storage volumes controlled by said one controller node.

Said features may be advantageous as in case it is determined that the I/O load of a particular logical storage volume violate said minimum threshold level, thereby indicating that the load of the logical volume is too low to justify the amount and/or quality of the currently assigned hardware resources, resources can be freed for other tasks for clients. For example, in case it was determined that the data of a particular logical storage volume is used only rarely, data compression may be enabled in order to free storage space (and the corresponding physical storage volumes providing said storage space), thereby allowing to reassign the freed physical storage volumes to other logical storage volumes. Likewise, by decreasing the cache size, it is possible to assign one or more physical storage volumes providing for the freed parts of the cache size to another cache of another logical storage volume. Likewise, in case a particular logical storage volume is spread among a plurality of physical storage devices by means of a 'striping' technique, reducing the number of physical storage volumes for providing said logical storage volume may free one or more of said physical storage volumes for use by other logical storage volumes having a higher load. Likewise, by decreasing the ratio of high-performing physical storage volumes in respect to low-performing physical storage volumes may free one or more high-performing physical storage volumes. In any case where the number or ratio of physical storage volumes underlying a particular logical storage volume is modified, only the data stored in storage blocks affected by this modification have to be moved to another set of physical storage blocks. The data residing on all other physical storage blocks constituting the logical storage volumes need not to be moved.

According to embodiments, the method further comprises: in case at least one first load parameter value of one of the logical storage volumes violates the load parameter threshold value it is compared with, automatically determining if all data of said logical volume shall be moved to one of the other storage volumes, whereby the corrective action is executed only in case it was determined that said data shall not be moved.

Said features may be advantageous as the full volume migration may still be executed automatically if this is determined to be the best option. For example, in case none of the above mentioned corrective actions can be executed due to technical constraints in respect to the logical storage volume and/or in respect to other logical storage volumes of the storage system, or in case one or more of the corrective actions have already been executed but the load of said logical storage volume is still too high (e.g. for guaranteeing compliance with one or more SLOs), it may still be advantageous to execute a full volume migration. Thus, by combining the option of full volume migration with any combination of the above-mentioned corrective actions, a highly dynamic storage system is provided operable to flexibly adapt to any kind of use case scenario.

According to further embodiments the method further comprises:
Providing two or more storage tiers belonging to the storage system. Each storage tier has assigned one or more of the logical storage volumes. Each of the logical storage volumes is assigned only to one of the storage tiers.
Assigning each of the two or more storage tiers one or more SLO load parameter threshold values, said SLO load parameter threshold values being service level objectives (SLOs) which shall be met by any one of the logical storage volumes assigned to said storage tier when providing storage space of said logical storage volume to the one or more clients.

The step of receiving, for each of the logical storage volumes, one or more load parameter threshold values comprises receiving the SLO load parameter threshold values of the one of the storage tiers said logical storage volume is assigned to. Said features may be advantageous in that they may provide for a method for controlling a storage system which automatically detects if any SLO of a storage tier and its assigned logical storage volumes is currently violated or is close to being violated. In this case, a corrective action can be determined and executed automatically for preventing a violation of SLOs or for modifying the configuration of a logical storage volume to automatically remedy and end said SLO violation.

According to further embodiments, executing the corrective action comprises sending a command to the storage system for modifying a configuration of the storage system to automatically execute the determined corrective action. The command may be sent from a monitoring and control module to the storage system. Depending on the embodiment, the monitoring and control module may be implemented as a plug-in of the storage system, or as an independently installable software unit running on the same or another computer as the host computer of the storage system. In the latter case, the command may be sent via a network, e.g. the Internet or an intranet, to the storage system.

According to further embodiments, the modification of the ratio of high-performing physical storage volumes and low-performing physical storage volumes comprises: automatically and selectively re-mapping said logical storage volume's logical storage blocks which are currently mapped to first physical storage blocks of the low-performing physical storage volume to second physical storage blocks of the high-performing physical storage volume, and automatically and selectively transferring data having been previously stored in the first physical storage blocks to the second physical storage blocks. Said features may be advantageous as only parts of the data stored to the logical storage volume are migrated to another physical storage volume. It is not necessary to execute a full-volume migration and the data traffic necessary in order to ensure compliance with the SLOs of the logical storage volume is reduced. Preferentially, this step makes use of data migration capabilities already provided by storage systems such as IBM's EasyTier storage system, thereby allowing to migrate said partial logical volume data transparently, i.e., without affecting the operation of application programs or users using said migrated partial data.

According to further embodiments, the high-performing physical storage volume and the low-performing physical storage volume belong to the same storage tier. According to some of said embodiments, the low-performing physical storage volume belongs to a first storage pool of physical storage volumes and the high-performing physical storage volume belong to a second storage pool of physical storage volumes. The first and the second storage pools both belong to said storage tier. The second storage pool may exclusively or predominantly comprise high-performing physical storage volumes while the first storage pool may exclusively or predominantly comprise low-performing physical storage volumes. According to embodiments, the step of automatically and selectively re-mapping said logical storage volume's logical storage blocks to the second physical storage blocks of the high-performing physical storage volume comprises automatically removing said low-performing physical storage volume from the first pool of physical storage volumes having currently constituting the logical storage volume and allocating the high-performing physical storage volume to the first pool of physical storage volumes constituting said logical storage volume. Thereby, the high-performing physical storage volume is removed from the second storage pool, e.g. by modifying a configuration comprising an assignment of physical storage volumes to one or more storage pools.

According to embodiments, the step of determining one or more corrective actions from the group of corrective actions comprises:

automatically determining if the storage system is supportive of multiple different types of physical storage volumes, wherein the storage system is supportive in case it is operable to map storage blocks of a first physical storage volume and of a second physical storage volume in a way to provide a single logical storage volume, the first and the second physical storage volume being of different type, and if it is, in addition operable to automatically move data stored in the first physical storage volume to the second physical storage volume.

Preferentially, the data to be moved is identified by evaluating the load characteristic of the storage blocs of the logical storage volume comprising said data. Data stored to blocks which have a high I/O load can thereby be identified as a candidate data set for partial data migration.

in case the storage system was determined to be supportive of multiple different types of physical storage volumes, executing the modification of the ratio of high-performing physical storage volumes and low-performing physical storage volumes constituting said logical storage volume;

monitoring said one or more load parameters being indicative of the current I/O load of said logical storage volume for obtaining second load parameter values;

comparing, for said logical storage volume, said second load parameter values with the corresponding one or more load parameter threshold values received for said logical storage volume;

in case at least one of the second load parameter values violates the load parameter threshold value it is compared with, automatically executing another one of the corrective actions.

According to further embodiments, executing the other corrective actions comprises: automatically determining if the storage system is operable to enable and disable real-time compression of all the data stored in the logical storage volume; in case the storage system was determined to be operable to enable and disable the real-time compression, executing the disabling or the enabling of the data compression functionality for said logical storage volume; monitoring said one or more load parameters being indicative of the current I/O load of said logical storage volume for obtaining third load parameter values; comparing, for said logical storage volume, said third load parameter values with the corresponding one or more load parameter threshold values received for said logical storage volume; in case at least one of the third load parameter values violates the load parameter threshold value it is compared with, automatically executing one of the other corrective actions.

According to further embodiments, executing the other corrective actions comprises: automatically determining if the storage system is supportive of a striping technique; in case the storage system was determined to be supportive of the striping technique, executing the modification of the physical-to-logical mapping of storage blocks of one or more physical storage volumes constituting said logical storage volume; monitoring said one or more load parameters being indicative of the current I/O load of said logical storage volume for obtaining fourth load parameter values; comparing, for said logical storage volume, said fourth load parameter values with the corresponding one or more load parameter threshold values received for said logical storage volume; in case at least one of the fourth load parameter values violates the load parameter threshold value it is compared with, automatically executing one of the other corrective actions.

According to further embodiments, executing the other corrective actions comprises: automatically determining if the storage system is operable to dynamically adjust the size of the cache memory associated with said logical storage volume; in case the storage system was determined to be operable to dynamically adjust the size, executing the modification of the size of the cache memory associated with said logical storage volume; monitoring said one or more load parameters being indicative of the current I/O load of said logical storage volume for obtaining fifth load parameter values; comparing, for said logical storage volume, said fifth load parameter values with the corresponding one or more load parameter threshold values received for said logical storage volume; in case at least one of the fifth load parameter values violates the load parameter threshold value it is compared with, automatically executing one of the other corrective actions.

According to further embodiments, the physical storage volumes are grouped into one or more groups of physical storage volumes which are collectively controlled by a volume controller node, wherein executing any of the corrective actions further comprises:

determining one of the controller nodes currently controlling said physical storage volume whose first load parameter characteristics violates the at least one load parameter threshold value;

automatically determining if the storage system is operable to dynamically adjust the grouping of the physical storage volume to decrease or increase the number of physical volumes controlled by said determined controller node;

in case the storage system was determined to be operable to dynamically adjust the grouping, decrease the number of physical volumes controlled by said determined controller node for increasing the performance of the logical storage volume being mapped to storage blocks of said physical storage volume or increasing the number of physical storage volumes controlled by said determined controller node for decreasing said performance;

monitoring said one or more load parameters being indicative of the current I/O load of said logical storage volume for obtaining sixth load parameter values;

comparing, for said logical storage volume, said sixth load parameter values with the corresponding one or more load parameter threshold values received for said logical storage volume;

in case one or more of the fifth load parameter values violates the load parameter threshold value it is compared with, automatically executing one of the other corrective actions.

According to embodiments, the first, second, third, fourth and fifth load parameter values are block-level performance parameters and/or file-system level parameters (FS-level parameters). The block-level load parameters may be, for example, an input rate and/or output rate of a data block of the first storage volume; an input density of a write operation and/or output density of a read operation on a data block; a response time of said data block in response to a read and/or write request; and a length of time for completing an input- and/or output operation on said data block. The FS-level load parameters may be, for example: frequency of file access; last file access time; file creation time; RTO requirements based on file type; RPO requirements based on file type; file size; file type; percentage of files assigned to one user relative to all files stored in a storage volume; percentage of files assigned to one user group relative to all files stored in a storage volume; average size of all files stored in a storage volume; and path of the file or sub-parts thereof.

In the following, labels A-E will be given to said five automatically executed steps for determining if the storage system is:

A) supportive of multiple different types of physical storage volumes;
B) supportive of a striping technique;
C) operable to enable and disable real-time compression of all the data stored in the logical storage volume;
D) operable to dynamically adjust the size of the cache memory; and
E) operable to dynamically adjust the grouping of the physical storage volumes.

According to one embodiment, the sequence of executing the determination steps is A→B→C→D→E starting with step A). In other embodiments, the sequence of determining the respective load parameter values may differ and all permutations of this set of steps or a sub-set thereof shall be covered by embodiments of the invention. The sequence of the corrective actions actually executed will depend on the result of the respective determination step. The determination steps {A, . . . , E} may respectively be implemented as an evaluation of a configuration file of the storage system and/or of an evaluation of various technical constraints of the hardware and software components of the storage systems. As an example, in order to dynamically modify the ratio between fast and slow disks in a given storage pool, the storage system needs to contain both fast and slow hard disks as well as the logic, e.g. implemented in software, to update the composition of a storage pool on the fly. According to embodiments, the selection and sequence of corrective Actions A, . . . , E is specified by means of one or more rules which are evaluated on the first, second, . . . , and/or fifth monitored load parameter values for determining if the at least one load parameter threshold value is met or not.

According to embodiments, the first load parameter values which are evaluated for determining if anyone of the steps A-E needs to be executed is different for each of said respective steps A-E.

In case the first load parameter values are I/O rate or latency parameters and at least one of said parameter values violates one of its corresponding threshold load parameter values, step A and its corresponding corrective action are executed.

In case the first load parameter values are performance related parameters or access-type related parameters such as percentage of random I/O (as opposed to sequential I/O) and at least one of said parameter values violates one of its corresponding threshold load parameter values, step B and its corresponding corrective action are executed.

In case the first load parameter values are FS-level parameters such as percentage of files of a particular type, e.g. "text", or performance related parameters such as CPU load of the controller nodes, and at least one of said parameter values violates one of its corresponding threshold load parameter values, step C and its corresponding corrective action are executed.

In case the first load parameter values are I/O rate or latency parameters and at least one of said parameter values violates one of its corresponding threshold load parameter values, step D and its corresponding corrective action are executed.

In case the first load parameter values are performance related parameters or access-type related parameters such as percentage of random I/O (as opposed to sequential I/O) parameters and at least one of said parameter values violates one of its corresponding threshold load parameter values, step E and its corresponding corrective action are executed.

In general, the higher the number of physical storage volumes controlled by a particular controller node, the lower the performance of the controlled physical storage volumes (and the logical volumes based thereupon) and vice versa. Said features may be advantageous as advanced storage controller nodes like IBM's SAN Volume Controller already come with some capability of adding a different or additional controller node for controlling the provision of a logical storage volume to one or more clients. Thus, said kinds of volume controllers may be used for automatically adapting the number of physical storage volumes controlled by one of a plurality of controller nodes in case said one controller node is under heavy load leading to performance degradation.

According to further embodiments, executing one of the other corrective actions comprises repeating said method automatically for dynamically optimizing the ratio of high-performing physical storage volumes and low-performing physical storage volumes constituting said logical storage volume, and/or a degree of data compression of data stored in said logical storage volume, and/or a degree of distribution of data among the logical storage volumes, and/or the size of cache memory assigned to each of the logical storage volumes. According to embodiments, each of said repeats comprises a step of determining whether all load parameter threshold values assigned to a particular logical storage volume are met. In case they are met, the method is terminated as the storage system is considered as being optimally configured. In case said threshold values are violated, one or more of the corrective actions are automatically executed until all threshold values of said volume are met.

In a further aspect the invention relates to a computer-readable storage medium comprising computer-interpretable instructions which, when executed by a processor, cause the processor to execute a method according to anyone of the above embodiments.

In a further aspect, the invention relates to a computer system comprising a storage system, the storage system comprising a plurality of logical storage volumes and providing storage space of one or more of said logical storage volumes to one or more clients; a server system comprising a monitoring and control unit being connected to the storage system and the one or more clients via a network. The server system is operable to monitor, for each of the logical storage volumes, one or more load parameters being indicative of a current I/O load of said logical storage volume for obtaining first load parameter values; receive, for each of the logical storage volumes, one or more load parameter threshold values; compare, for each of the logical storage volumes, the monitored first parameter values with the corresponding one or more load parameter threshold values received for said logical storage volume; in case at least one of the first load parameter values of one of the logical storage volumes violates the load parameter threshold value it is compared with, automatically execute one of the above mentioned corrective actions.

BRIEF DESCRIPTION OF THE DRAWINGS

In the following, preferred embodiments of the invention will be described in greater detail by way of example, only making reference to the drawings in which.

DETAILED DESCRIPTION

In the following, like numbered elements in these figures are either similar elements or perform an equivalent function.

Figure 1:
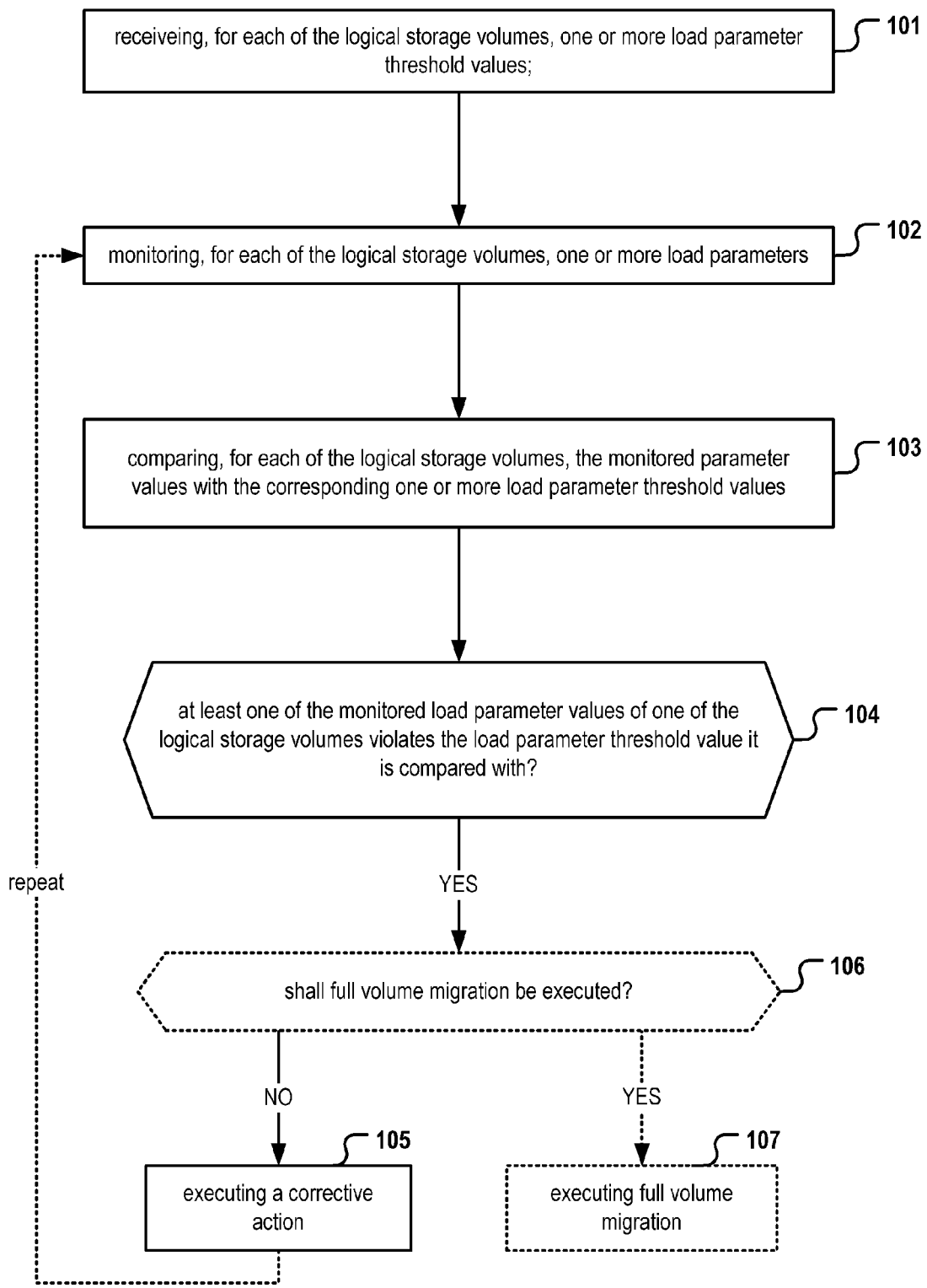
FIG. 1 shows s a flowchart of an embodiment of the invention.
Figure 2:
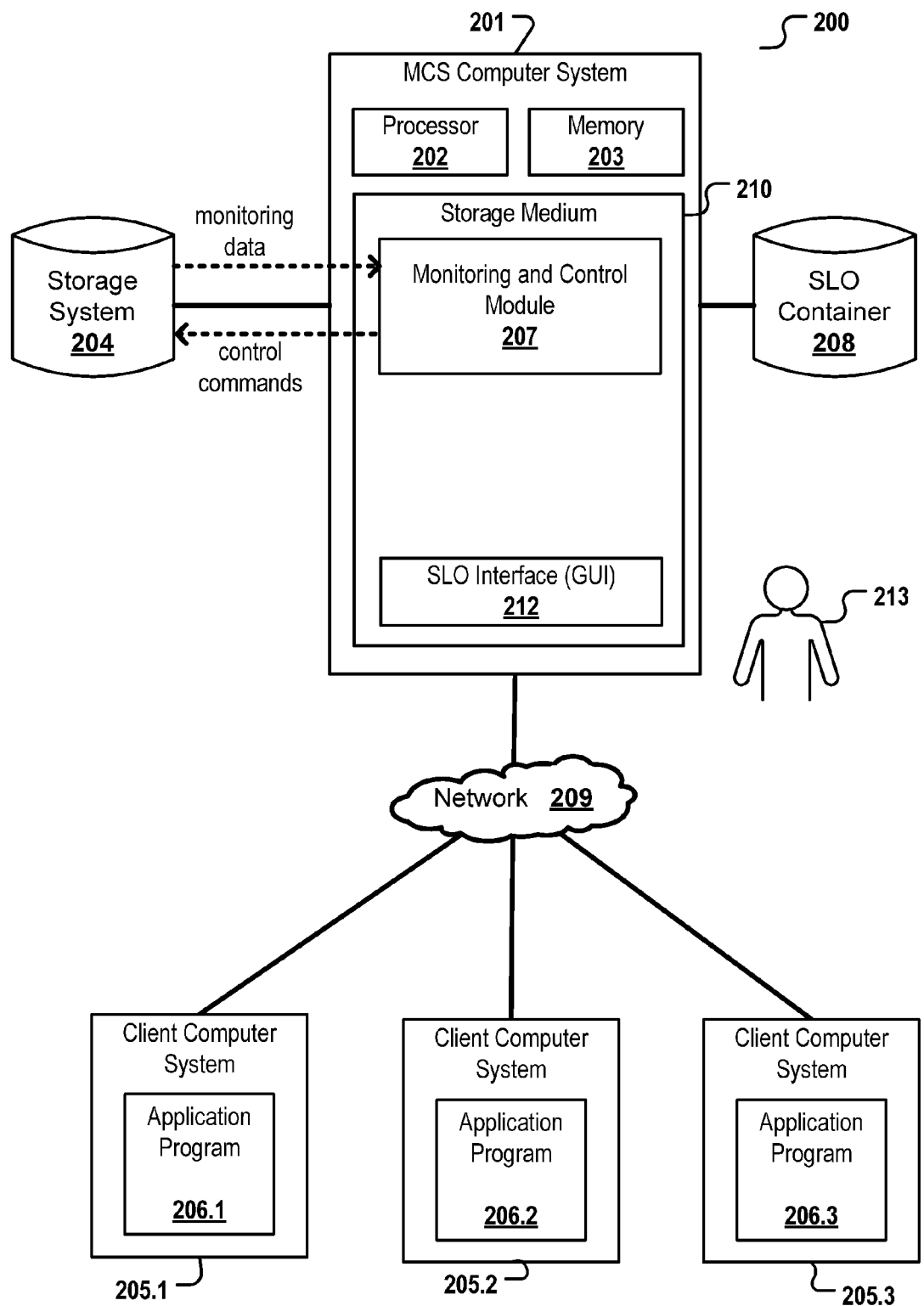
FIG. 2 shows a block diagram of a computer system.

FIG. 1 shows a flowchart of a method to be executed by a monitoring and control module 207 as depicted in FIG. 2. The monitoring and control module 207 may thereby make use of monitoring capabilities provided by storage system 204. In a first receiving step 101, for each of the logical storage volumes of the storage system 204 one or more load parameter threshold values are received. For example, said threshold values are read from a configuration file stored in the storage system 204 or stored in the SLO container 208. In a monitoring step 102, for each of the logical storage volumes of the storage system, one or more load parameter values are measured. The measured load parameter values are compared in a succeeding comparison step 103 with the corresponding one or more load parameter threshold values. Said steps may be executed for each of the logical storage volumes of the storage system. In a decision step 104, it is determined if at least one of the monitored load parameter values of one of the logical storage volumes violates one of the corresponding load parameter threshold values the monitored load parameter value is compared with. If this is the case, in step 105 a corrective action is automatically executed. According to the depicted embodiment, the method may in addition comprise a further determination step 106 in which it is determined if a full volume migration step shall be executed. According to said embodiment, the corrective action step 105 is only executed if it was deter-mined that the full volume migration shall not be executed. Otherwise, a full volume migration step 107 is executed. According to embodiments, the steps 102, 103, 104, 105 and optionally also steps 106 and 107 are repeatedly executed until the comparison step 103 returns a result that all the monitored parameter values of a particular storage volume meets the respective load parameter threshold values and are therefore in accordance with one or more SLAs specified for said logical storage volume.

FIG. 2 is a block diagram providing an overview on a computer system 200 comprising a monitoring and control computer system 201 which is operatively coupled to a storage system 204 and an SLO container 208. The MCS computer system comprises a processor 202 and a memory 203 for executing instructions stored in storage medium 210. The SLO container is a data repository, e.g. a relational database, for storing the load parameter threshold values, e.g. in the form of rules comprising one or more SLOs. The rules may be used by the monitoring and control module 207 for executing a determination step for determining which one of a plurality of corrective actions shall be executed given a current load of a storage volume and given a particular configuration and hardware composition of the storage system 204. The monitoring and control module is operable to receive monitoring data from the storage system and to send control commands to the storage system for modifying the configuration of said storage system. The MCS computer system further comprises a display device for displaying a graphical user interface 'SLO interface' allowing a user 213 to create and modify the threshold parameter values and/or rules stored in the SLO container 208. The MCS computer system is connected via a network 209 to a plurality of client computer systems 205 respectively comprising one or more application programs 206 requesting access to one or more of the logical storage volumes. By dynamically modifying the configuration of the storage system 204, the MCS computer system guarantees that the storage space and/or data contained therein is provided to the clients in accordance with the respectively agreed upon service level agreements and corresponding SLOs.

Figure 3:
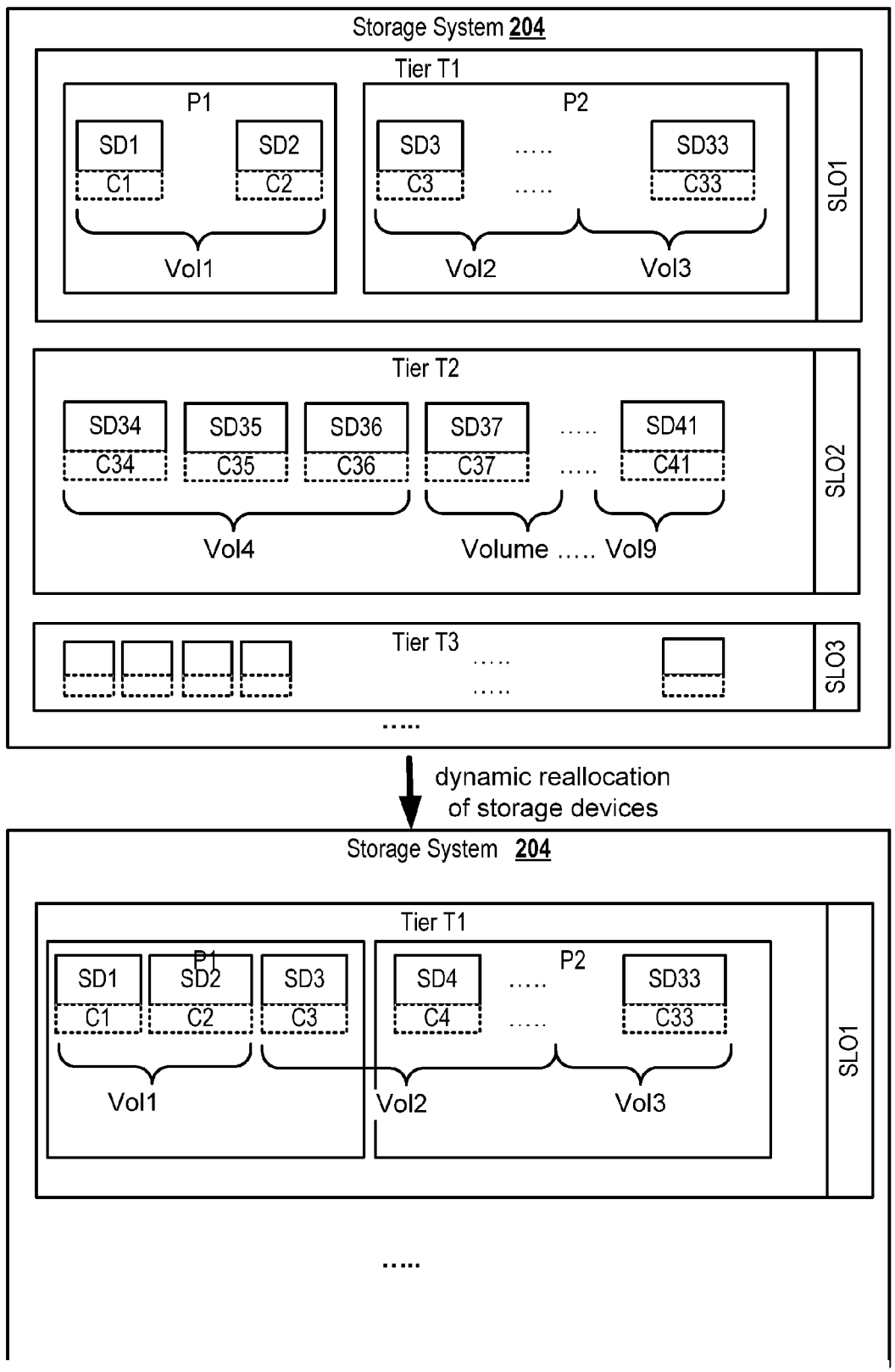
FIG. 3 shows components of the storage system in greater detail.

FIG. 3 shows the architecture of the storage system 204 in greater detail. The storage system comprises multiple storage tiers T1, T2, T3, . . . respectively having assigned a set of load parameter threshold values, for example, the SLOs, SLO1, SLO2 and SLO3. Each logical storage volume belonging to one of the storage tiers needs to conform to the SLOs of the respective storage tier. The storage system manages a plurality of physical storage volumes SD1-SD41. Each physical storage volume is characterized by a respective set of one or more load parameter values $C1, \ldots, C41$ which may depend on hardware properties and/or on the current I/O load of said physical storage volume or a combination thereof. The storage blocks of one or more of said physical storage volumes are mapped to logical storage blocks for providing one or more logical storage volumes Vol1, . . . , Vol9. Each of the logical storage volumes is characterized by a respective set of one or more load parameter values (not shown) which depend on the hardware properties of the one or more underlying physical storage volumes and/or on the current I/O load of the logical storage volume. The physical storage volumes of the depicted embodiment are grouped into different pools of physical storage volumes P1, P2, whereby the physical storage volumes of each pool typically share a common performance level.

The storage pools may be contained in the same computer system which uses said logical volumes, or in an external, dedicated storage system which the storage system accesses via a network such as LAN, WAN, or SAN. The storage pools may be assigned to storage tiers respectively grouping the pools exhibiting similar characteristics. These characteristics may relate to the performance of the physical storage volumes of the storage pools, their reliability or other factors which are of relevance to the operator of the storage system. Before the reallocation of the physical storage volumes is executed, pool P1 comprises two low-performing volumes SD1 and SD2 which together constitute the logical storage volume Vol1, and pool P2 comprises a plurality of high-performing volumes SD3-SD33 constituting logical storage volumes Vol2 and Vol3. After having determined that the load parameter values of the logical storage volume Vol1 violate a maximum load parameter threshold value due to heavy load of Vol1, the physical storage volume SD3 is dynamically assigned from pool P2 to pool P1 and its physical blocks are mapped to the logical storage blocks of volume Vol1. Thereby, the ratio of high-performance physical storage volumes constituting the logical volume Vol1 is increased, thereby also increasing Vol1's performance.

Figure 4:
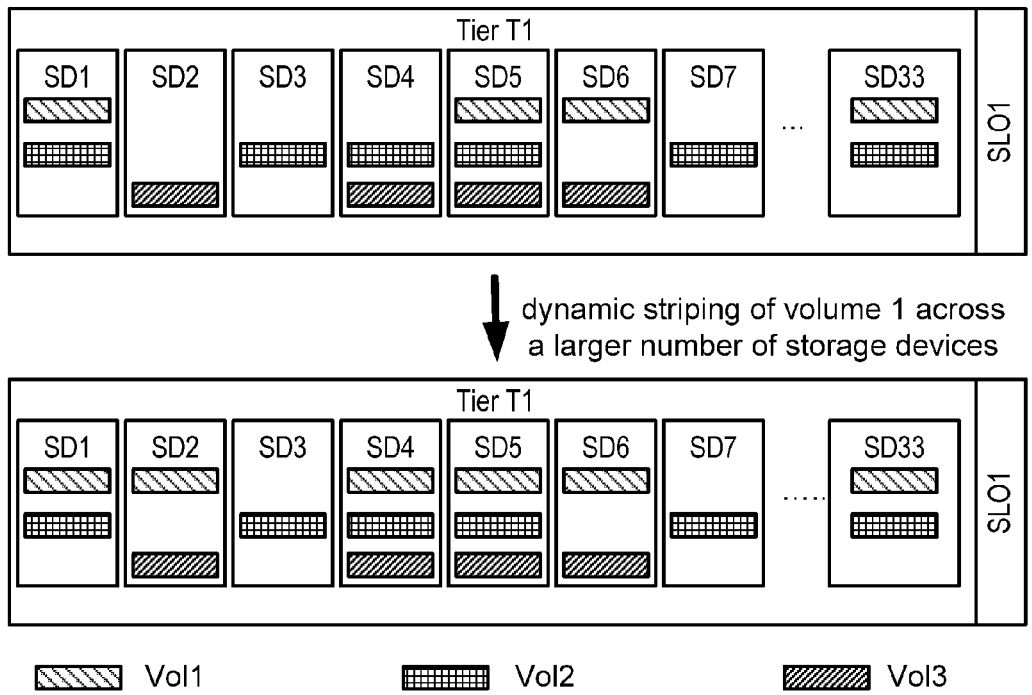
FIG. 4 illustrates the striping of logical storage volumes.

FIG. 4 shows the effect of executing a striping functionality on a plurality of physical storage volumes as D1-SD33. The logical storage blocks of logical storage volume Vol1 are spread on volumes SD1, SD5, SD6 and SD33 before the striping of volume 1 across a large number of storage devices is executed. After having executed the striping operation, said volume is spread among the volumes SD1, SD2, SD4, SD5, SD6 and SD33 thereby increasing the number of read/write heads operable to execute I/O operations from 4 to 6.

Figure 5:
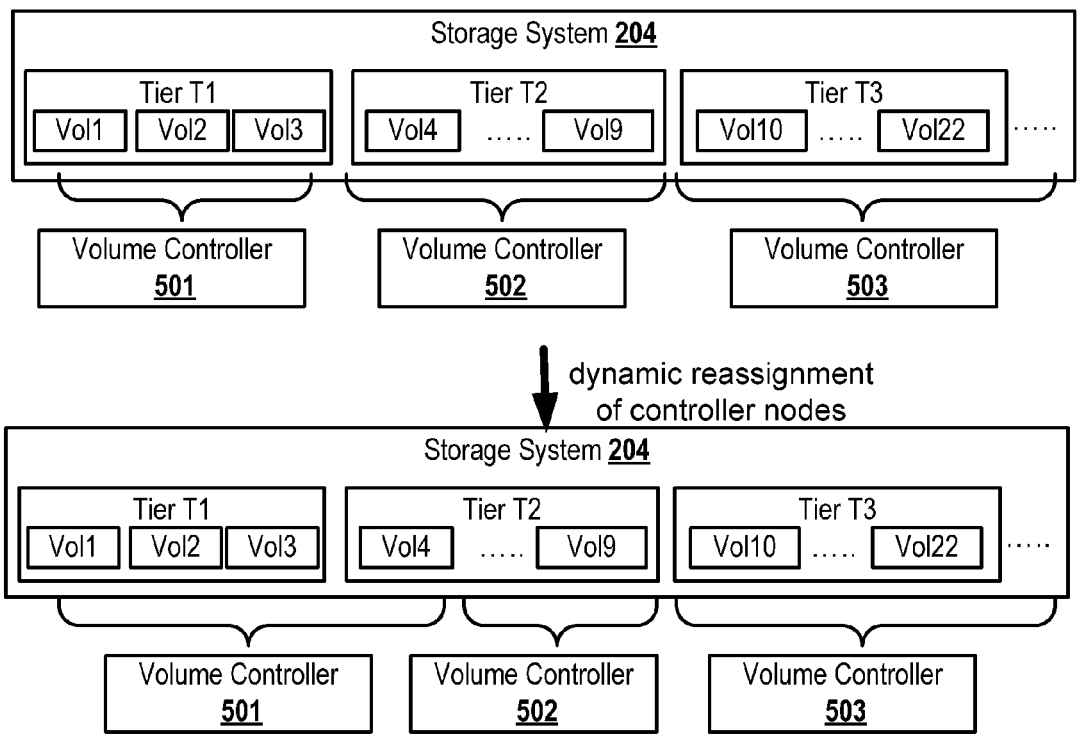
FIG. 5 shows modification of a grouping of volumes sharing the same volume controller node.

FIG. 5 shows the effects of a modification of the grouping of one or more logical storage volumes Vol1, . . . , Vol22 and three volume controller nodes 501-503.

The invention claimed is:

1. A computer system comprising:
   a storage system comprising a plurality of logical storage volumes that provide storage space on one or more of said logical storage volumes to one or more clients;
   a server system comprising a monitoring and control unit coupled to the storage system and the one or more clients via a network and being adapted for:
      monitoring, for each of the logical storage volumes, one or more load parameters being indicative of a current I/O load of said logical storage volume for obtaining first load parameter values;
      receiving, for each of the logical storage volumes, one or more load parameter threshold values;
      comparing, for each of the logical storage volumes, the monitored first parameter values with the corresponding one or more load parameter threshold values received for said logical storage volume; and
      in case at least one of the first load parameter values of one of the logical storage volumes violates the load parameter threshold value it is compared with, automatically executing a corrective action while avoiding a full volume migration, wherein the corrective action comprises at least two of:
         modifying a ratio of high-performing physical storage volumes and low-performing physical storage volumes constituting said one logical storage volume;
         disabling or enabling a data compression functionality of said logical storage volume, the data compression functionality automatically compressing any data stored to said one logical storage volume;
         modifying a physical-to-logical mapping of storage blocks of one or more physical storage volumes constituting said logical storage volumes, thereby increasing the number of physical storage volumes constituting said logical storage volume by adding additional physical storage volumes to the mapping or decreasing the number of physical storage volumes constituting said logical storage volume by removing one or more of said mapped physical storage volumes from said mapping;
         modifying a size of a cache memory associated with said one logical storage volume; and
         modifying a grouping, said grouping assigning each of a plurality of controller nodes a disjunct group of the physical storage volumes to be controlled by said controller node, the modification increasing or decreasing the number of physical storage volumes controlled by one of said controller nodes, said one controller node currently controlling at least one of the physical storage volumes mapped to memory blocks of said one logical storage volume.

2. The computer system of claim 1, wherein executing the corrective action comprises sending a command to the storage system for modifying a configuration of the storage system to automatically execute the determined corrective action.

3. A computer system comprising:
   a storage system comprising a plurality of logical storage volumes that provide storage space on one or more of said logical storage volumes to one or more clients;
   a server system comprising a monitoring and control unit coupled to the storage system and the one or more clients via a network and being adapted for:
      monitoring, for each of the logical storage volumes, one or more load parameters being indicative of a current I/O load of said logical storage volume for obtaining first load parameter values;
      receiving, for each of the logical storage volumes, one or more load parameter threshold values;
      comparing, for each of the logical storage volumes, the monitored first parameter values with the corresponding one or more load parameter threshold values received for said logical storage volume; and
   in case at least one of the first load parameter values of one of the logical storage volumes violates the load parameter threshold value it is compared with, automatically executing a corrective action while avoiding a full volume migration, further comprising:
      determining one or more corrective actions from a group of corrective actions to be executed by automatically determining if the storage system is supportive of multiple different types of physical storage volumes, wherein the storage system is supportive in case it is operable to map storage blocks of a first physical storage volume and of a second physical storage volume in a way to provide a single logical storage volume, the first and the second physical storage volume being of different type, and if it is supportive of multiple different types of physical storage volumes, automatically move data stored in the first physical storage volume to the second physical storage volume;
      in case the storage system is determined to be supportive of multiple different types of physical storage volumes, executing a modification of a ratio of high-performing physical storage volumes and low-performing physical storage volumes constituting said one logical storage volume;

monitoring said one or more load parameters being indicative of the current I/O load of said logical storage volume for obtaining second load parameter values;

comparing, for said logical storage volume, said second load parameter values with the corresponding one or more load parameter threshold values received for said logical storage volume; and in case at least one of the second load parameter values violates the load parameter threshold value it is compared with, automatically executing another one of the corrective actions.

4. The computer system of claim 3, wherein executing another one of the corrective actions comprises:

automatically determining if the storage system is operable to enable and disable real-time compression of all the data stored in the logical storage volume;

in case the storage system was determined to be operable to enable and disable the real-time compression, executing the disabling or the enabling of the data compression functionality for said logical storage volume;

monitoring said one or more load parameters being indicative of the current I/O load of said logical storage volume for obtaining third load parameter values;

comparing, for said logical storage volume, said third load parameter values with the corresponding one or more load parameter threshold values received for said logical storage volume; and in case at least one of the third load parameter values violates the load parameter threshold value it is compared with, automatically executing one of the other corrective actions.

5. A computer system comprising:

a storage system comprising a plurality of logical storage volumes that provide storage space on one or more of said logical storage volumes to one or more clients;

a server system comprising a monitoring and control unit coupled to the storage system and the one or more clients via a network and being adapted for:

monitoring, for each of the logical storage volumes, one or more load parameters being indicative of a current I/O load of said logical storage volume for obtaining first load parameter values;

receiving, for each of the logical storage volumes, one or more load parameter threshold values;

comparing, for each of the logical storage volumes, the monitored first parameter values with the corresponding one or more load parameter threshold values received for said logical storage volume; and in case at least one of the first load parameter values of one of the logical storage volumes violates the load parameter threshold value it is compared with, automatically executing a corrective action while avoiding a full volume migration, further comprising:

repeating said method automatically for dynamically optimizing at least two of:

the ratio of high-performing physical storage volumes and low-performing physical storage volumes constituting said logical storage volume;

a degree of data compression of data stored in said logical storage volume;

a degree of distribution of data among the logical storage volumes;

the size of cache memory assigned to each of the logical storage volumes; and the grouping of the physical storage volumes to groups of physical storage volumes collectively controlled by one of the controller nodes.

* * * * *